United States Patent

Tengham

[11] Patent Number: 6,041,888
[45] Date of Patent: Mar. 28, 2000

[54] LOW FREQUENCY FLEXTENSIONAL ACOUSTIC SOURCE FOR UNDERWATER USE

[75] Inventor: Rune Tengham, Västerås, Sweden

[73] Assignee: Unaco Systems AB, Vasteras, Sweden

[21] Appl. No.: 09/171,247

[22] PCT Filed: Mar. 5, 1997

[86] PCT No.: PCT/NO97/00063

§ 371 Date: Oct. 8, 1998

§ 102(e) Date: Oct. 8, 1998

[87] PCT Pub. No.: WO97/41453

PCT Pub. Date: Nov. 6, 1997

[30] Foreign Application Priority Data

Apr. 30, 1996 [NO] Norway ......................... 961764

[51] Int. Cl.⁷ ................................. G01V 1/40
[52] U.S. Cl. ............ 181/102; 181/101; 181/108; 181/110; 181/113; 181/117; 181/119; 367/153; 367/155; 367/157; 367/158; 367/159; 367/160; 310/26; 310/334; 310/337; 310/354
[58] Field of Search .................... 181/101, 108, 181/110, 117, 102, 113, 119, 120; 367/155, 157, 158, 160, 161, 163, 168, 153, 159, 140, 141, 165, 162, 167, 172; 310/26, 334, 337, 354

[56] References Cited

U.S. PATENT DOCUMENTS

| | | | |
|---|---|---|---|
| 4,706,230 | 11/1987 | Inoue et al. | 367/174 |
| 4,763,307 | 8/1988 | Massa | 367/174 |
| 4,764,907 | 8/1988 | Dahlstrom et al. | 367/163 |
| 4,862,429 | 8/1989 | Rolt | 367/165 |
| 4,894,811 | 1/1990 | Porzio | 367/174 |
| 4,932,008 | 6/1990 | Rolt | 367/165 |
| 4,941,202 | 7/1990 | Upton | 367/165 |
| 5,126,979 | 6/1992 | Rowe, Jr. et al. | 367/175 |
| 5,375,101 | 12/1994 | Wolfe et al. | 367/175 |
| 5,515,343 | 5/1996 | Boucher et al. | 367/158 |
| 5,546,361 | 8/1996 | Boucher et al. | 367/158 |

FOREIGN PATENT DOCUMENTS

WO 94/22036 9/1994 WIPO .
WO 96/36888 11/1996 WIPO .

OTHER PUBLICATIONS

Brigham, G. and Glass, B.:"Present Status in Flextensional Transducer Technology." J. Acoust. Soc. AM., vol. 68, No. 4, pp. 1046–1052, Oct. 1980.

*Primary Examiner*—Robert E. Nappi
*Assistant Examiner*—Eglo San Martin
*Attorney, Agent, or Firm*—Arnold & Associates

[57] ABSTRACT

Acoustic source, especially for use in seismic studies at sea, with sound emitting surfaces adapted to be put into sound emitting movements toward and away from each other by use of a drive unit in a known manner, in which the sound emitting surfaces comprise two curved plate members essentially symmetrically positioned in relation to the longitudinal axis of the source, forming a convex cross section with their respective upper and lower edges converging towards each other, and the respective upper and lower edges of the sound emitting surfaces are flexibly connected to two corresponding side elements positioned between them, and that the source comprises a rigid frame for supporting the drive unit, comprising at least two rigid slide rods stretching through the side elements, and that rigid covers are mounted on the slide rods, covering at least the whole side elements, thus forming rigid, covering surfaces with a constant distance between the covers.

8 Claims, 2 Drawing Sheets

LOW FREQUENCY FLEXTENSIONAL ACOUSTIC SOURCE FOR UNDERWATER USE

This invention relates in general to acoustic sources for the generation of soundwaves in water, especially soundwaves with low frequencies, e.g. for use in seismic studies at sea. Such sources, being used in generating soundwaves in water, may be described in different ways, such as seismic emitters, flextensional sources or acoustic vibrators, such as sonars.

The acoustic source according to the invention may preferably be used in relation to such sound- or toneemitters, since the soundwaves emitted into the water may be reflected from the sea bottom and geological formations beneath it, with succeeding monitoring and detection using hydrophones or geophones of different types.

The invention is especially aimed at a certain embodiment of sound emitting membranes or shells in acoustic sources, and the present embodiment may be considered to be related to certain types of flextensional emitters.

Flextensional emitters are described in many publications, one example being L. H. Royster:"The flextensional concept. A new approach to the design of underwater acoustic transducers", Appl. Acoust. 3 (1970), pp 117–226. Other examples are G. Bromfield: "Class IV flextensional transducers", Proceedings Second International Workshop on Power Transducers, Toulon, (France) June 1990, and G. Brigham and B. Glass: "Present status in flextensional transducer technology", J. Acoust. Soc. A., 68(1980), pp. 1046–1052.

Most flextensional shells are based on the principle of changes in volume in a vibrating, elliptic shell. When the long axis of an ellipse is set into vibration the length of the short axis will also vibrate, but with a much larger amplitude. This makes the ellipse shape an effective generator of acoustic energy at low frequencies. Generally the basic resonance frequency of the elliptic shell is so low that the length of the shell is small when compared to the wavelength in water.

A limiting factor for this kind of shells are the mechanical tensions forced upon the shell when large vibrational amplitudes are to be obtained. Normally aluminum or glass-fibre armed plastic is used as shell material. The use of such shells are also limited as a result of their complex shape, which lead to complicated manufacturing methods.

A special example of a complicated shape, being visually and functionally different from the abovementioned elliptic, round shells (egg-shaped), are hyperbolic, round shells. The advantage with this shape is that the short axis will vibrate in face with the long axis. An embodiment based on this principle is described in D. F. Jones and C. G. Reithmeier: "Low frequency barrel-stave projectors" (Proceedings UDT 93, Nice, France, Microwave Exh. & Pub. Ltd. 1993, pp 251–253).

This last embodiment comprises in short two octagonal end plates joined together with eight rod-shaped elements having a concave curvature and being positioned in an essentially circular or polygonal arrangement surrounding an axis of symmetry. A major problem with this design is the many slits between the rod elements, and the question of sealing and possible contact between these elements.

In Norwegian patent application no. 94.1708 (corresponding to International patent application no. PCT/NO95/00071) an acoustic source is described with sound emitting surfaces having a generally concave shape and being adapted to be set into vibrational movement using a drive assembly affecting the sound emitting surfaces through at least one pressure element and two platelike end parts being connected to the sound emitting surfaces. The novelty of this invention is primarily related to the fact that the sound emitting surfaces are formed by two curved membranelike plate members having width and height dimensions of comparable sizes and being mounted back-to-back, that the plate-like end pieces have essentially rectangular shapes with a first pair of opposite side edges connected to the end parts of the plate members, and that another pair of side edges on each end piece, as well as the side edges of the plate members are connected to two side pieces which close the acoustic source on each side, preferably in a sealing way.

An object of this invention is to provide an improved acoustic source, which through a simple and suitable embodiment provides a dependable and reliable source unit, at the same time having a high acoustic efficiency.

On the basis of the mentioned prior art this invention is thus based on an acoustic source primarily for use in seismic studies at sea, with sound emitting surfaces adapted to be put into sound emitting movement to and from each other using a drive unit in an, in itself, known way.

The new and inventive features according to this invention is that the sound emitting surfaces are formed by two curved plate members essentially symmetrically positioned in relation to the axis of the source forming a convex cross section with the upper and the lower edges converging towards each other, that the upper and lower edges of the sound emitting surfaces are flexibly connected to two corresponding side elements positioned between them, and that the source comprises a rigid frame, preferably for the support of the drive assembly, comprising at least two rigid sliding rods stretching between the side elements, and that covers are mounted on the slide rods being adapted to cover essentially all of the side elements and possibly parts of the sound emitting surfaces in order to form rigid, covering surfaces with constant distance between them.

The invention is in the following described with reference to the accompanying drawings, in which.

Figure 1:
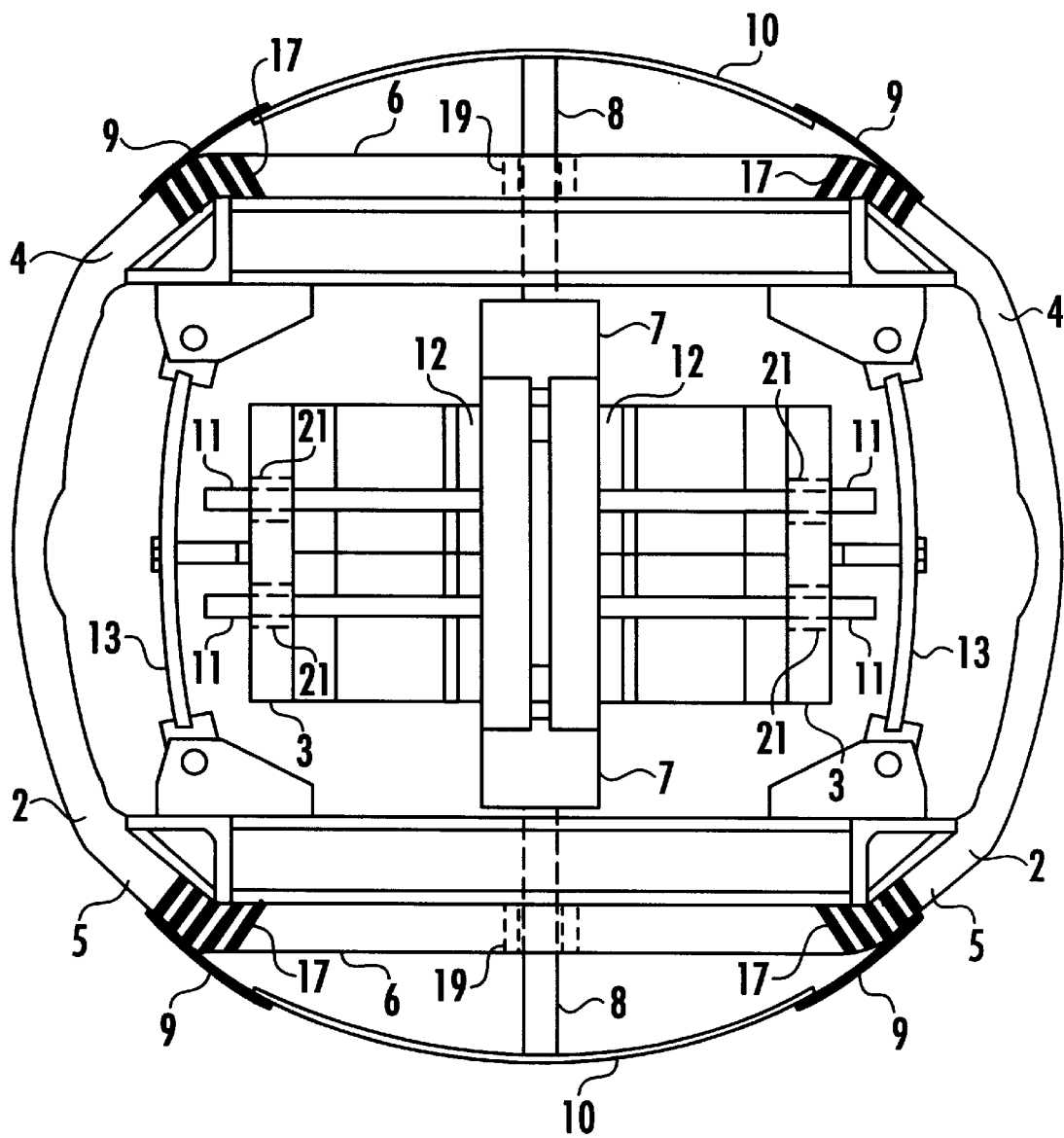
FIG. 1 shows a section of one embodiment of an acoustic source according to the invention.

FIG. 1 shows an embodiment of the invention with an essentially circular cross section comprising sound emitting surfaces 2 being in their upper 4 and lower 5 ends flexibly connected by rubber members 17 or other flexible material to side elements 6. The side elements 6 are covered with covers 10. When the side elements 6 are pulled towards and away from each other using the drive assembly 3,12,13 the sound emitting surfaces are respectively pushed away from and towards each other, and generates thus a pressure wave which may propagate through water. Normally the side elements 6 in an acoustic source with the shape shown in FIG. 1 would generate acoustic waves with a phase being opposite compared to the acoustic waves generated from the sound emitting surfaces 2. In order to prevent this, and at the same time maintain the compact shape, the acoustic source is provided with covers 10 covering the side elements 6 and keeping a constant distance from each other using the slide rods 8 and the frame 7. The slide rods 8 have a sliding, and possibly sealed, connection to the side elements, using slide bearings 19.

The drive unit 3,12,13 is mounted inside a frame 7. The frame 7 is held in position inside the source using the slide rods 8 drawn vertically in the drawings. Preferably horizontal slide rods 11 are also used to lock the position of the frame 7 in the vertical direction. These may for example be mounted using slide bearings 21 to the outer drive parts 3. If other types of drive units are used these second slide rods 11 may be mounted in suitable suspension points or in relation to, but usually not through, the sound emitting surfaces.

The covers 10 are preferably tightly connected to the source with sealing strips 9 or similar devices, so that the movements of the side elements do not propagate through the surrounding water. Thus the signal from the sound emitting surfaces 2 will not be distorted by signals from the side elements 6. This gives an advantage in that the dimensions of the sound emitting surfaces may be chosen independently of size of the side elements 6. If the room between the covers and the side elements contains air the friction because of the movements of the side elements will not influence the output gain of the source in any great degree. In this case the slide bearings 19 around the slide rods 8 do not need to be tight.

Figure 2:
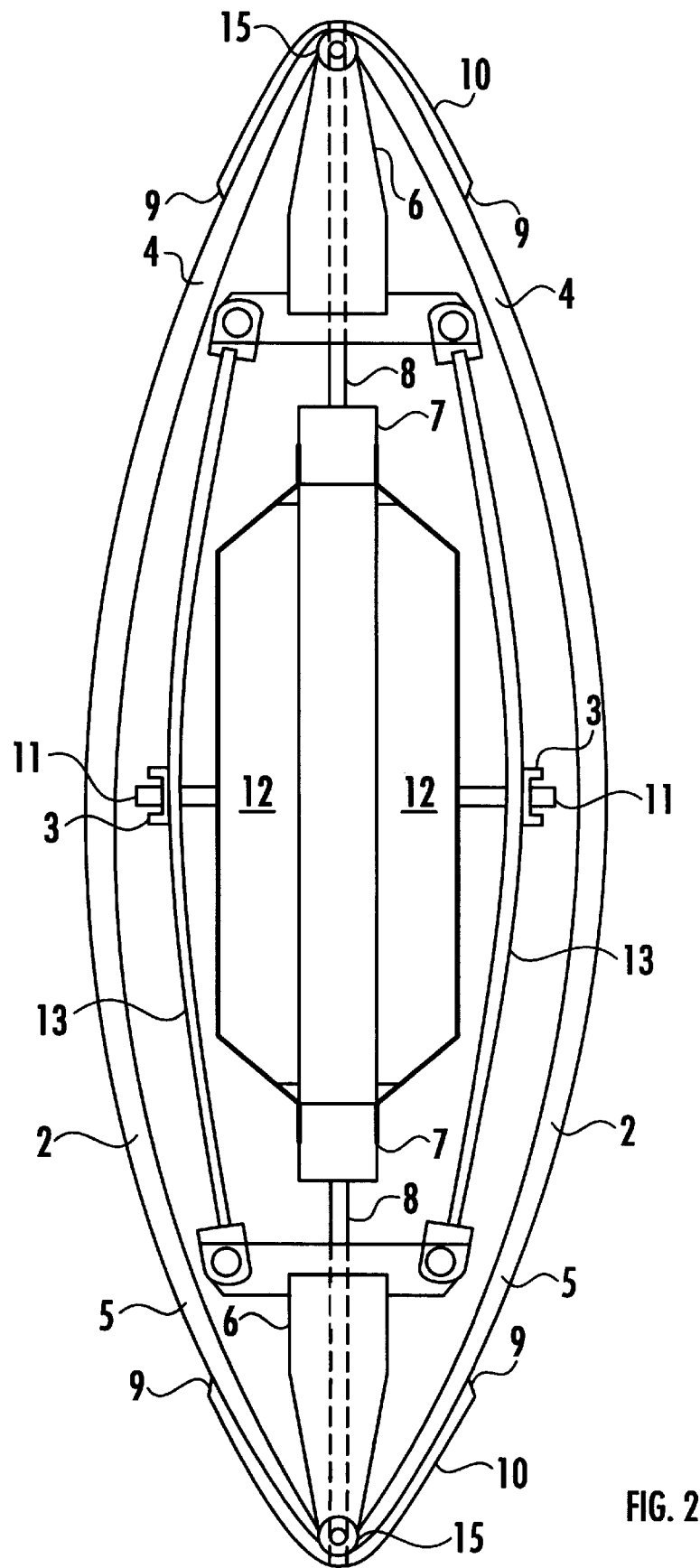
FIG. 2 shows an alternative embodiment according to the invention.

Corresponding parts may, however, also be used in combination with other kinds of sources, such as previously known elliptic sources. In FIG. 2 a source is shown with an essentially elliptic cross section, where the side elements 6 are made small by using hinger 15 connecting the upper and lower edges 4,5, respectively, of the sound emitting surfaces. A similar solution in which two rows of hinges 15, each connecting the side elements 6 with the edges 4,5 of one of the sound emitting surfaces 2, may of course also be contemplated.

The acoustic sources shown in the drawings are equipped with electrodynamic drive units. These are described in detail in Norwegian patent application no. 95.2605, (corresponding to International patent application no. PCT/NO96/00131). In short the drive units comprise pairs of electromagnetic and magnetic elements 3,12 being given a relative movement in relation to each other by applying a varying electric current. One of these parts 12 are mounted firmly in relation to a frame 7, and the other 3 is mounted on a transmission device 13. A movement of the second part 3 gives the transmission device 13 a movement which propagates to the side elements 6, which in turn moves the sound emitting surfaces 2. Other types of known drive units, for example based on electric rotation motors like the ones described in Norwegian patent application no. 95.1949 (corresponding to International patent application no. PCT/NO96/00119) or Norwegian patent no. 176.457 (corresponding to International patent application no. PCT/NO94/00057), may of course also be used.

The dimensions of the acoustic source in the longitudinal direction (not shown in the figures) will vary, depending on use, and is not important to the invention. The number of slide rods 8,11, and drive units 3,12,13 will depend on the length of the source. In the drawings the slide rods are shown in a position centrally on the covers. Other solutions, such as slide rods positioned in pairs side by side along the length of the source, will also be possible.

I claim:

1. Acoustic source having a longitudinal axis, especially for use in seismic studies at sea, with sound emitting surfaces adapted to be put into sound emitting movements towards and away from each other by use of a drive unit in which the sound emitting surfaces comprise two curved plate members essentially symmetrically positioned in relation to the longitudinal axis of the source, forming a convex cross section with their respective upper and lower edges converging towards each other, and the respective upper and lower edges of the sound emitting surfaces are flexibly connected to two corresponding side elements positioned between the upper and lower edges of the sound emitting surfaces, characterized in that the source comprises a rigid frame for supporting the drive unit comprising at least two rigid slide rods stretching through the side elements and permitting relative axial movement of the slide rods with respect to the side elements, and that rigid covers having outer edges are mounted on the slide rods, covering at least the whole side elements, thus forming rigid, covering surfaces with a constant distance between the covers.

2. Acoustic source according to claim 1, characterized in that the edges of the covers are sealed to provide a watertight contact between the covers and the rest of the source.

3. Acoustic source according to claim 1, characterized in that the side elements are connected to one or more hinges suitable for fastening each of the upper and lower edges, respectively, of the sound emitting surfaces to each other or to the side elements.

4. Acoustic source according to claim 1, characterized in that the coupling between the side elements and the sound emitting surfaces comprises rubber.

5. Acoustic source according to claim 1, characterized in that the side elements comprises side plates.

6. Acoustic source according to claim 1, characterized in that the drive unit is an electromagnetic drive unit.

7. Acoustic source according to claim 1, characterized in that the slide rods are fastened to the side elements with slide bearings.

8. Acoustic source according to claim 1, characterized in that the frame also comprises slide bearings associated with the drive unit and at least two additional second slide rods, mounted essentially perpendicular to the longitudinal axis of the source and mounted in the slide bearings associated with the drive unit.

* * * * *